United States Patent
Silver et al.

(10) Patent No.: US 10,550,744 B2
(45) Date of Patent: Feb. 4, 2020

(54) APPARATUS AND METHOD FOR DETECTING UREA DEPOSIT FORMATION

(71) Applicants: Caterpillar Inc., Peoria, IL (US); Perkins Engines Company Limited, Eastfield (GB)

(72) Inventors: Ronald Silver, Peoria, IL (US); Benjamin Reid, Loughborough (GB); Thomas Steffen, Loughborough (GB)

(73) Assignee: Perkins Engines Company Limited, Peterborough (GB)

( * ) Notice: Subject to any disclaimer, the term of this patent is extended or adjusted under 35 U.S.C. 154(b) by 232 days.

(21) Appl. No.: 15/127,988

(22) PCT Filed: Apr. 1, 2015

(86) PCT No.: PCT/EP2015/057264
§ 371 (c)(1),
(2) Date: Sep. 21, 2016

(87) PCT Pub. No.: WO2015/150498
PCT Pub. Date: Oct. 8, 2015

(65) Prior Publication Data
US 2017/0096924 A1    Apr. 6, 2017

(30) Foreign Application Priority Data
Apr. 2, 2014 (EP) .................................. 14163211

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9418* (2013.01); *B01D 53/9495* (2013.01);
(Continued)

(58) Field of Classification Search
CPC ............ B01D 53/9418; B01D 53/9495; F01N 11/002; F01N 13/008; F01N 3/2066;
(Continued)

(56) References Cited

U.S. PATENT DOCUMENTS 7,673,525 B2  3/2010  Huang
8,210,033 B2  7/2012  Kondo et al.
(Continued)

FOREIGN PATENT DOCUMENTS

| DE | 10358495 A1 * | 7/2005 | .......... F01N 3/0807 |
|---|---|---|---|
| DE | 10358495 A1 | 7/2005 | |
| EP | 0675267 A1 | 10/1995 | |

OTHER PUBLICATIONS

Search Report for related European Application No. 14163211.7; report dated Aug. 5, 2014.
(Continued)

*Primary Examiner* — Jason D Shanske
*Assistant Examiner* — Matthew T Largi
(74) *Attorney, Agent, or Firm* — Murgitroyd & Company

(57) ABSTRACT

An apparatus for detecting urea deposits in an exhaust pipe of an internal combustion engine is provided, where the urea is introduced into the exhaust pipe in an aqueous urea solution via a nozzle. The apparatus comprises at least one radiation receiver which, in use, is located within the exhaust pipe downstream of the nozzle. The apparatus further comprises an electronic control unit in communication with the receiver, wherein the receiver communicates radiation data to the control unit which allows the control unit to establish whether deposits have formed within the exhaust pipe. A control valve is also provided which controls flow of the solution to the nozzle in response to signals from the control unit. A method of detecting urea deposits in an exhaust pipe of an internal combustion engine is also
(Continued)

provided, as in an automotive vehicle incorporating the aforementioned apparatus.

20 Claims, 2 Drawing Sheets

(51) Int. Cl.
*F01N 11/00* (2006.01)
*F01N 13/00* (2010.01)
*F02D 41/02* (2006.01)

(52) U.S. Cl.
CPC .......... F01N 11/002 (2013.01); F01N 13/008 (2013.01); F02D 41/0245 (2013.01); *F01N 2550/05* (2013.01); *F01N 2560/12* (2013.01); *F01N 2610/02* (2013.01); *F01N 2610/146* (2013.01); *F01N 2900/16* (2013.01); *F02D 2200/08* (2013.01)

(58) Field of Classification Search
CPC .. F01N 3/208; F01N 2550/05; F01N 2560/12; F01N 2610/02; F01N 2610/146; F01N 2610/1493; F01N 2900/16; F02D 41/0245; F02D 2200/08; Y02A 50/2325
See application file for complete search history.

(56) References Cited

U.S. PATENT DOCUMENTS

| | | | | |
|---|---|---|---|---|
| 9,206,723 | B2* | 12/2015 | Ponnathpur | F01N 3/2066 |
| 9,212,587 | B2* | 12/2015 | Light-Holets | F01N 3/208 |
| 2007/0144152 | A1* | 6/2007 | Lueders | F01N 3/035 |
| | | | | 60/286 |
| 2008/0271440 | A1* | 11/2008 | Xu | B01D 53/9431 |
| | | | | 60/295 |
| 2011/0030343 | A1 | 2/2011 | Kiser et al. | |
| 2011/0146240 | A1 | 6/2011 | Wilhelm et al. | |
| 2011/0167805 | A1* | 7/2011 | Chen | F01N 3/023 |
| | | | | 60/286 |
| 2012/0234169 | A1 | 9/2012 | Painter et al. | |
| 2012/0291419 | A1 | 11/2012 | Snopko | |
| 2013/0074590 | A1 | 3/2013 | Bertow | |
| 2013/0192206 | A1 | 8/2013 | Keghelian et al. | |

OTHER PUBLICATIONS

International Search Report Application No. PCT/EP2015/067264; reported on Jun. 22, 2015.

* cited by examiner

APPARATUS AND METHOD FOR DETECTING UREA DEPOSIT FORMATION

CROSS-REFERENCE TO RELATED APPLICATION

This Application is a 35 USC § 371 US National Stage filing of International Application No. PCT/EP2015/057264 filed on Apr. 1, 2015, and claims priority under the Paris Convention to European Patent Application No. EP 14163211.7 filed on Apr. 2, 2014.

FIELD OF THE DISCLOSURE

The present invention relates to the field of automotive selective catalytic reduction (SCR) systems, which reduce the quantity of Nitrogen Oxides ($NO_X$) in exhaust gases of vehicles. More specifically, the present invention provides an apparatus and method for detecting the build-up of urea deposits in the exhaust from such SCR systems.

BACKGROUND OF THE DISCLOSURE

SCR systems used in heavy duty vehicles such as, for example, off-highway trucks and on-highway buses typically use ammonia as a reducing agent which is injected into the exhaust in the form of aqueous urea. At unsuitable operating conditions, this urea can form solid deposits in the exhaust instead of the desired production of ammonia, and over time these deposits can block the exhaust and require maintenance. Avoiding deposits is a complicated process, because they are difficult to predict and to detect without a visual inspection.

US2013-0192206A1 proposes an approach where deposits are detected by the ammonia released during the thermal decomposition of deposits at high temperatures. However, the approach is indirect, has limited accuracy and is not helpful during long periods of low temperature exhaust flow when deposits are most likely. An alternative proposal has been made to measure the pressure drop across the exhaust section, but it is not sensitive enough to detect deposits early on as a significant pressure drop is only formed once the exhaust is nearly blocked.

It is an aim of the present invention to obviate or mitigate the disadvantages of the aforementioned proposals.

SUMMARY OF THE DISCLOSURE

According to a first aspect of the invention there is provided an apparatus for detecting urea deposits in an exhaust pipe of an internal combustion engine, the urea being introduced into the exhaust pipe in an aqueous urea solution via a nozzle. The apparatus comprises at least one radiation receiver which, in use, is located within the exhaust pipe downstream of the nozzle. The apparatus further comprises an electronic control unit in communication with the receiver, wherein the receiver communicates radiation data to the control unit which allows the control unit to establish whether deposits have formed within the exhaust pipe. A control valve is also provided which controls flow of the solution to the nozzle in response to signals from the control unit.

According to a second aspect of the invention there is provided a method of detecting urea deposits in an exhaust pipe of an internal combustion engine, wherein urea is introduced into the exhaust pipe in an aqueous urea solution via a nozzle. The method comprises the steps of providing a control valve for controlling flow of the solution to the nozzle. Radiation is received through at least one radiation receiver located within the exhaust pipe downstream of the nozzle. Data regarding the received radiation is communicated from the receiver to an electronic control unit. It is then established whether deposits have formed within the exhaust pipe in response to the communicated data, and the control valve is instructed to adjust the flow of solution when it is established that deposits have formed.

According to a third aspect of the invention there is provided an automotive vehicle comprising an apparatus in accordance with the first aspect of the invention.

BRIEF DESCRIPTION OF THE DRAWINGS

A preferred embodiment of the present invention will now be described, by way of example only, with reference to the accompanying drawings, in which.

DETAILED DESCRIPTION OF THE DISCLOSURE

Figure 1:
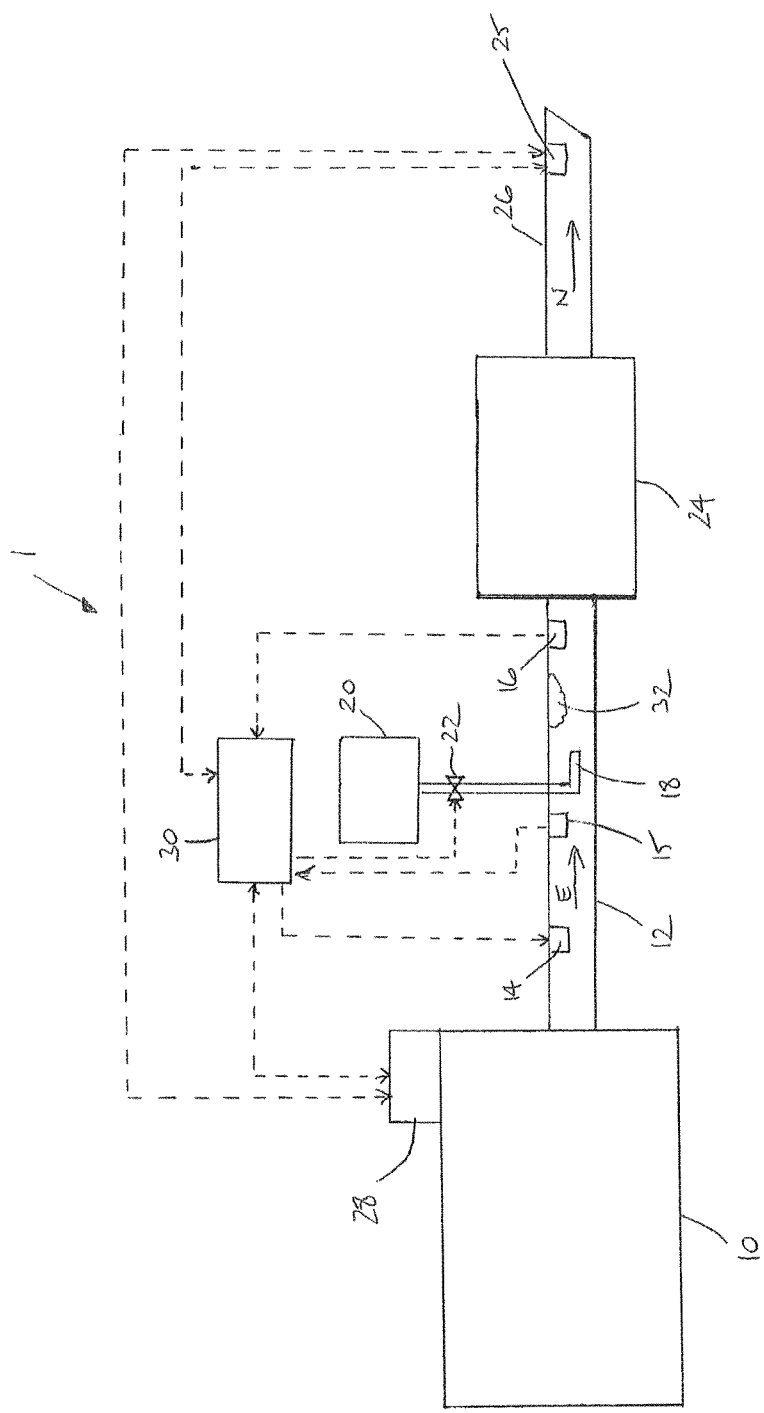
FIG. 1 is a schematic view of an apparatus for detecting urea deposits in an automotive selective catalytic reduction (SCR) system.

FIG. 1 illustrates in schematic form an apparatus 1 for detecting urea deposits in an automotive selective catalytic reduction (SCR) system. Exhaust gases flow from an internal combustion engine 10 in the direction of arrow E along an exhaust mixing pipe 12. Located within the mixing pipe 12 are at least one radiation transmitter 14 and at least one radiation receiver 16 downstream of the wave transmitter(s) 14. Here the term "radiation" is intended to encompass energy emitted from a source, in this case the transmitter, in the form of rays or waves of heat, light or sound, for example. The at least one wave transmitter and receiver may be an acoustic, or sound, wave transmitter and receiver which respectively transmit and receive acoustic waves which are either travelling in the exhaust gas within the exhaust pipe 12 or travelling along the surface of the exhaust pipe 12. Alternatively the transmitter and receiver may transmit and receive electromagnetic waves. At least one environmental sensor 15 is also located within the pipe 12. The sensor 15 may be a temperature sensor or a pressure sensor, for example. There may be a plurality of such sensors 15, with at least one temperature sensor and one pressure sensor being present.

Opening into the mixing pipe 12 between the transmitter 14 and receiver 16 is a urea injector nozzle 18 through which an aqueous urea solution is selectively injected into the mixing pipe 12. The urea is contained within a tank 20 and its flow to the nozzle 18 is controlled by a control valve 22 forming part of the apparatus of the present invention. Downstream of the mixing pipe is an SCR catalyst 24, which is of a known type and is adapted to reduce the amount of $NO_X$ in the exhaust gases flowing from the engine 10.

The apparatus also includes an electronic control unit (ECU) 30, which has overall control of the apparatus. The ECU 30 can communicate with the at least one wave transmitter 14 in order to have acoustic or electromagnetic waves transmitted within or upon the pipe 12. The ECU 30 is also in communication with the at least one wave receiver 16 so that it can monitor the passage of waves, and the at least one environmental sensor 15 so that it may monitor environmental conditions within the pipe 12. The ECU 30 also controls the control valve 22 to selectively commence, stop or adjust the flow of the aqueous urea solution to the nozzle 18. The ECU 30 is also in communication with one or more environmental sensors 25 downstream of the SCR catalyst 24 so that it may monitor the performance of the catalyst 24. The environmental sensor(s) 25 may be temperature and/or pressure and/or $NO_X$ sensor(s), for example. The ECU 30 is also in two-way communication with an engine controller 28 which has overall control of the performance of the engine 10. The engine controller 28 is also in communication with the environmental sensor(s) 25.

INDUSTRIAL APPLICABILITY

During normal operation of an SCR system, urea is injected into the hot exhaust gases within the mixing pipe 12. The urea decomposes into isocyanic acid (HNCO) and ammonia ($NH_3$). As the urea is an aqueous solution, the isocyanic acid reacts with the water and produces further ammonia and carbon dioxide ($CO_2$). When it comes into contact with the SCR catalyst 24, the ammonia reacts with the $NO_X$ to produce harmless Nitrogen ($N_2$) and water ($H_2O$) which can then pass out of the SCR catalyst 24 to atmosphere via exhaust pipe 26 in the direction of arrow N.

However, in unsuitable operating conditions the urea injection can lead to the formation of solid deposits 32 within the mixing pipe 12. Over time these deposits may block the mixing pipe 12 and need to be cleaned out before normal operation can resume. An example of unsuitable operating conditions may be where there is a low exhaust flowrate (e.g. around 15-25% of rated flow) at a lower than normal temperature (e.g. ≤200° C.). Another example may be where the flowrate and temperature are within predetermined limits but the exhaust flow is not well mixed, leading to relatively cold spots on the surface of the pipe.

Figure 2:
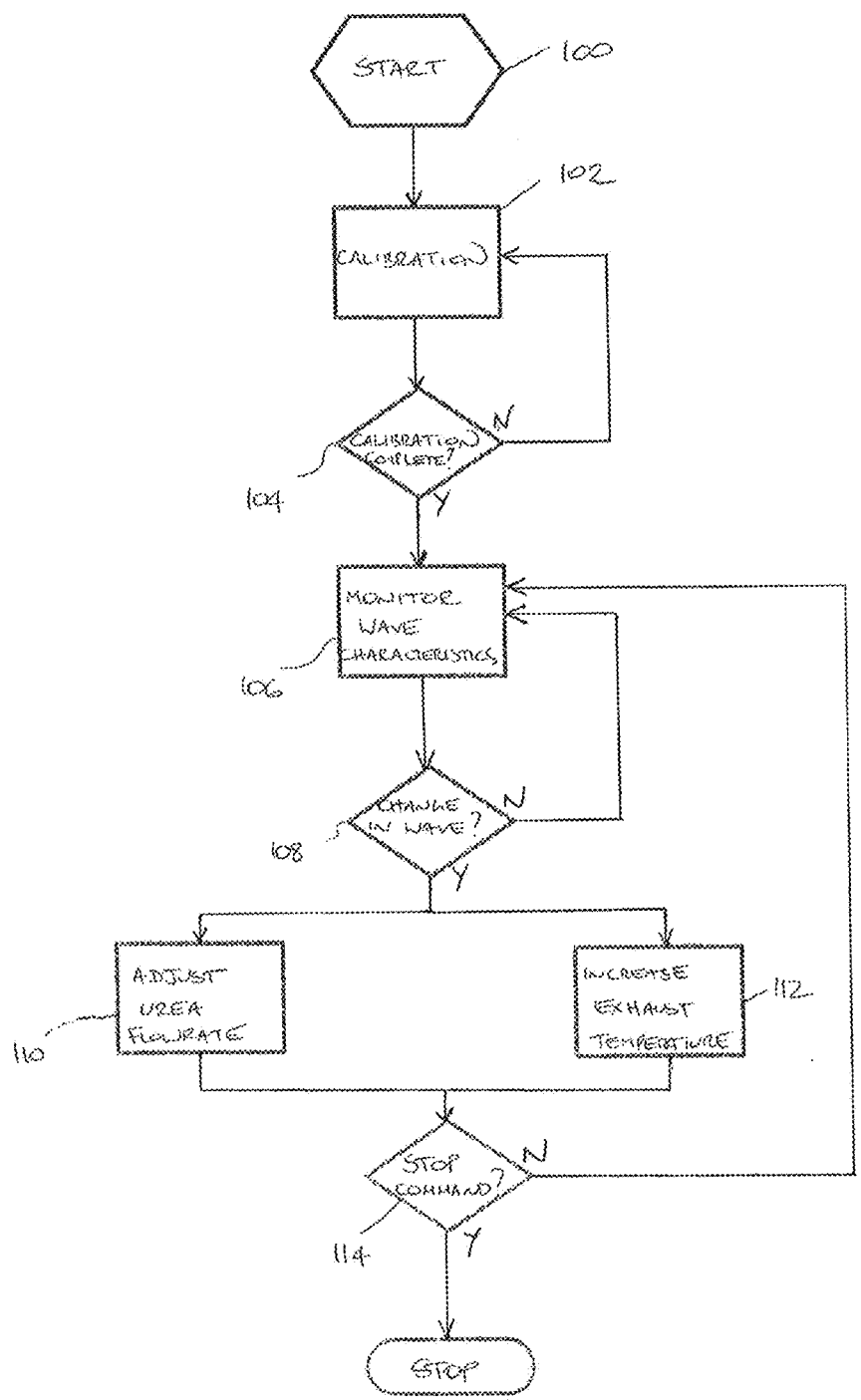
FIG. 2 is a flowchart illustrating a control method or process for detecting urea deposits in an automotive SCR system.

An automated process which allows the apparatus to detect and remove such deposits from the mixing pipe will now be described with reference to both FIGS. 1 and 2. The process begins with a start-up step 100 and may be followed by an initial calibration process step 102. In the calibration step 102, the ECU 30 instructs the wave transmitter 16 to transmit waves in the mixing pipe 12. As stated above these waves may be sound or electromagnetic waves, but for the purposes of this illustrative example the at least one transmitter 16 and receiver 18 transmit and receive sound waves. The transmitter 16 and receiver 18 may be set up to transmit and receive sound waves in the exhaust gases, or else may transmit and receive the waves along the surface of the pipe 12. As no injection of urea has yet taken place, the mixing pipe 12 will be free of urea deposits and this calibration step thus informs the ECU 30 of a base line indicator/comparator for when zero deposits are present in the pipe 12. Data received from the at least one environmental sensor 15 also allows the ECU to adjust the calibration to compensate for variations in environmental conditions within the pipe 12. If the calibration step is not employed the control unit may have historic base line indicator/comparator data stored in a memory and ready to be compared with real-time data received during operation of the apparatus.

At decision step 104 the process establishes whether the calibration is complete. If not, the process reverts to the calibration process step 102. If calibration is complete, or the apparatus is relying on stored calibration data, the ECU 30 will instruct the control valve 22 to open at least partially so as to release aqueous urea solution from the tank 20 to the nozzle 18. At the same time the ECU 30 instructs the at least one transmitter 14 to begin transmitting sound waves within the mixing pipe 12 and will receive data back from the at least one receiver 16 regarding wave characteristics within the pipe 12. This is reflected by monitoring process step 106 of the process shown in FIG. 2. If urea deposits begin to build up in the pipe during this monitoring step, the ECU 30 will be able to determine this on the basis of changes in wave characteristics being received by the receiver 16. One way in which this may be caused is by the increase in mass of the pipe wall where a urea deposit is present, resulting in a lower pitch of sound than that established during calibration.

At decision step 108 the ECU will look at whether there has been a change in wave characteristics on the basis of the signals from the receiver 16. If there has been no change the process will loop back to monitoring step 106 and continue to monitor for changes. If a change has been detected, the ECU will (i) instruct the control valve 22 to adjust the urea flow or shut it off completely at process step 110, and/or (ii) may send a request to the engine controller 28 that the engine control be adjusted to increase the temperature of the exhaust gases entering the pipe 12 at process step 112. Reducing or closing off the urea flow limits the formation of additional deposits, whilst increasing the engine exhaust temperature can decompose and remove existing deposits that the ECU has detected. Similarly, temporarily increasing the rate of urea flow through the nozzle 18 via the control valve 22 can have a similar effect to increasing the exhaust temperature in decomposing and removing the existing deposits without the need to communicate with the engine controller 28.

The ECU will then decide whether a stop command has been received at decision step 114. If such a command is received the ECU will shut down the apparatus and process at termination step 116. However, if no such command is received it will revert to monitoring the wave characteristics at process step 106. Following the removal of the existing urea deposits by the process the wave characteristics will have reverted back to the base line indicator/comparator established at calibration step 102 or stored within the ECU memory.

The apparatus and method of the present invention provide for the automatic detection of urea deposits in the exhaust mixing pipe, as well as the automatic removal of such deposits before they can have a detrimental effect of the performance of the exhaust and SCR system.

The apparatus may comprise just one wave transmitter and wave receiver, but alternatively may comprise a plurality of transmitters and corresponding receivers. It should be understood that references to transmitters and receivers herein are not intended to limit the present invention to the use of separate and distinct transmitters and receivers. Instead, the present invention also encompasses a transceiver arrangement in which the at least one transmitter and at least one receiver are combined such that they share common circuitry and/or a single housing.

In a further alternative embodiment, the apparatus may comprise a wave receiver but no wave transmitter. In such a case, the receiver may receive sound waves in the mixing pipe created by the exhaust flow itself. The calibration step would involve establishing baseline sound waveforms at a range of operating temperatures and flow rate conditions within the pipe. The formation of urea deposits within the pipe result in a change in pitch of the sound in the pipe, thus indicating the presence of urea deposits.

As described above, the ECU of the apparatus may include a memory module (not shown) within which the ECU may store calibration data and/or certain performance conditions or parameter data which were present when the ECU established that urea deposits were forming in the pipe. The ECU may use this stored information to ensure that such recorded conditions or parameters are not re-created in the future, either alone or in conjunction with the engine controller.

These and other modifications and improvements may be incorporated without departing from the scope of the present invention.

The invention claimed is:

1. An apparatus for detecting urea deposits forming on an inner wall of an exhaust pipe of an internal combustion engine, the urea being introduced into the exhaust pipe in an aqueous urea solution via a nozzle, and the apparatus comprising:
   at least one radiation receiver located within the exhaust pipe downstream of the nozzle;
   an electronic control unit in communication with the at least one radiation receiver, wherein the at least one radiation receiver communicates radiation data to the electronic control unit, and wherein the electronic control unit determines whether urea deposits have formed on the inner wall of the exhaust pipe based on the radiation data communicated from the at least one radiation receiver; and
   a control valve controlling flow of the aqueous urea solution to the nozzle in response to signals from the electronic control unit, wherein the electronic control unit communicates signals to the control valve to change the flow of the aqueous urea solution to the nozzle to decompose the urea deposits in response to determining that urea deposits have formed on the inner wall of the exhaust pipe.

2. The apparatus of claim 1, further comprising at least one radiation transmitter located within the exhaust pipe upstream of the at least one radiation receiver, wherein the electronic control unit is in communication with the at least one radiation transmitter and the at least one radiation receiver.

3. The apparatus of claim 2, wherein the at least one radiation transmitter and the at least one radiation receiver respectively transmit and receive acoustic waves travelling within the exhaust pipe.

4. The apparatus of claim 2, wherein the at least one radiation transmitter and the at least one radiation receiver respectively transmit and receive acoustic waves travelling along the surface of the exhaust pipe.

5. The apparatus of claim 2, wherein the at least one radiation transmitter and the at least one radiation receiver respectively transmit and receive electromagnetic waves.

6. The apparatus of claim 1, wherein the engine includes an engine controller adapted to control the engine, and wherein the electronic control unit can communicate with the engine controller such that it can instruct the engine controller to increase exhaust gas temperature within the exhaust pipe to decompose the urea deposits in response to determining that urea deposits have formed on the inner wall of the exhaust pipe.

7. The apparatus of claim 1, further comprising at least one environmental sensor located within the exhaust pipe, wherein the at least one environmental sensor is in communication with the electronic control unit such that the electronic control unit may adjust the calibration of the apparatus in response to environmental data received from the at least one environmental sensor.

8. The apparatus of claim 7, wherein the at least one environmental sensor is selected from the group consisting of a temperature sensor and a pressure sensor.

9. The apparatus of claim 1, wherein the electronic control unit includes a memory adapted to store data relating to one or more performance conditions or parameters at which it is established that urea deposits were forming in the pipe.

10. A method of detecting urea deposits on an inner wall of an exhaust pipe of an internal combustion engine, wherein urea is introduced into the exhaust pipe in an aqueous urea solution via a nozzle, the method comprising the steps of:
    providing a control valve for controlling flow of the aqueous urea solution to the nozzle;
    receiving transmitted radiation through at least one radiation receiver located within the exhaust pipe at a location downstream of the nozzle;
    communicating data regarding the received radiation from the at least one radiation receiver to an electronic control unit;
    establishing whether urea deposits have formed on the inner wall of the exhaust pipe based on the communicated data from the at least one radiation receiver; and
    instructing the control valve to adjust the flow of the aqueous urea solution to the nozzle to decompose the urea deposits in response to determining that urea deposits have formed on the inner wall of the exhaust pipe.

11. The method of claim 10, further comprising the step of transmitting the radiation from at least one radiation transmitter located at a location within the exhaust pipe upstream of the at least one radiation receiver, wherein the at least one radiation receiver is receiving radiation transmitted from the at least one radiation transmitter.

12. The method of claim 11, wherein the radiation transmitted and received is acoustic waves travelling within the exhaust pipe.

13. The method of claim 11, wherein the radiation transmitted and received is acoustic waves travelling along the surface of the exhaust pipe.

14. The method of claim 11, wherein the radiation transmitted and received is electromagnetic waves.

15. The method of claim 10, wherein the engine includes an engine controller and the method further comprises the step of the electronic control unit instructing the engine controller to increase exhaust gas temperature within the exhaust pipe to decompose the urea deposits in response to determining that urea deposits have formed on the inner wall of the exhaust pipe.

16. The method of claim 10, further comprising the initial steps of:
    calibrating the electronic control unit, wherein the at least one radiation receiver receives radiation transmitted by the at least one radiation transmitter when the pipe is initially clear of urea deposits, and communicating calibration data from the at least one radiation receiver to the electronic control unit; and
    storing the calibration data in the electronic control unit so that the electronic control unit can compare the calibration data with real-time data received from the at least one radiation receiver to establish when urea deposits have formed within the pipe.

17. The method of claim 16, wherein at least one environmental sensor is located within the exhaust pipe, the method further comprising the step of the electronic control unit adjusting the calibration data received in response to environmental data received from the at least one environmental sensor.

18. The method of claim 17, wherein the at least one environmental sensor provides environmental data selected from the group consisting of temperature data and pressure data.

19. The method of claim 10, further comprising the steps of:
- the electronic control unit recording one or more performance conditions or parameters at which it is established that urea deposits have formed within the pipe; and
- communicating one or more control signals to the control valve to ensure such conditions or parameters are not replicated in the future.

20. An automotive vehicle comprising the apparatus of claim 1.

* * * * *